(No Model.)
C. S. CANNON.
METALLIC VEHICLE WHEEL.
No. 517,791. Patented Apr. 3, 1894.
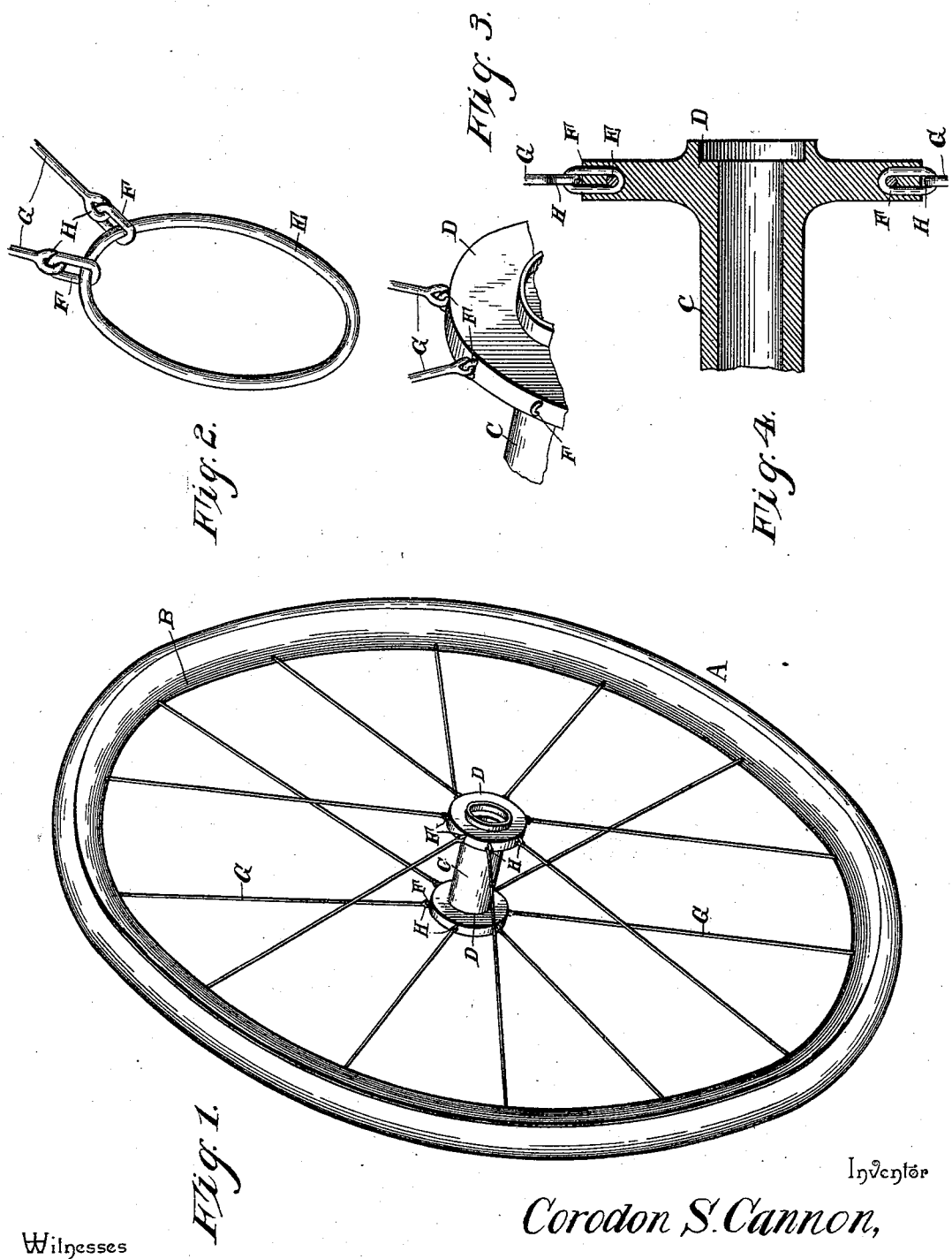
Witnesses
C. A. Ford.
D. P. Wolhaupter.
Inventor
Corodon S. Cannon,
By his Attorneys,
C. A. Snow & Co.

UNITED STATES PATENT OFFICE.

CORODON S. CANNON, OF BATTLE CREEK, MICHIGAN.

METALLIC VEHICLE-WHEEL.

SPECIFICATION forming part of Letters Patent No. 517,791, dated April 3, 1894.

Application filed June 30, 1893. Serial No. 479,271. (No model.)

*To all whom it may concern:*

Be it known that I, CORODON S. CANNON, a citizen of the United States, residing at Battle Creek, in the county of Calhoun and State of Michigan, have invented a new and useful Metallic Vehicle-Wheel, of which the following is a specification.

This invention relates to metallic vehicle wheels; and it has for its object to provide certain improvements in wheels of this character employed in connection with cycles or other vehicles, whereby the durability and efficiency of such wheels shall be greatly increased.

To this end the main and primary object of the present invention is to construct a vehicle wheel having a novel and efficient spoke connection with the hub, which connection yields readily to all strain placed upon the wheel and consequently relieves the spokes from that strain which ordinarily snaps their connection with the hub of the wheel, and in this connection is intended to relieve the spokes of side or lateral as well as direct strain.

With these and other objects in view which will readily appear as the nature of the invention is better understood, the same consists in the novel construction, combination, and arrangement of parts, hereinafter more fully described, illustrated and claimed.

In the accompanying drawings:—Figure 1 is a perspective view of a metallic vehicle wheel constructed in accordance with the present invention. Fig. 2 is an enlarged detail in perspective showing the connection of the spokes with the hub spacing ring before the completion of the hub. Fig. 3 is a similar view showing a portion of the hub complete. Fig. 4 is an enlarged detail sectional view of the flexible or loose spoke connection at the hub of the wheel.

Referring to the accompanying drawings, A represents an ordinary metallic vehicle wheel having the outer felly B, and the central hub C. The hub C, is manufactured in any suitable manner and is provided at its ends with the cast metal hub collars D.

In manufacturing the hub of the wheel A, the collars D, are cast onto the inclosed spacing rings E. The inclosed spacing rings E, are therefore firmly embedded in the body of the hub ends and form a rigid and firm anchor for the spoke attaching links F. The spoke attaching links F, are of an oval shape and are designed to have one end thereof encircle the embedded spacing ring E, which ends are also embedded in the hub collars which are cast partially around the links, in order to leave the outer ends thereof exposed for the attachment of one end of the wheel spokes G, thereto. The wheel spokes G, are secured at their outer ends to the felly B, in the ordinary manner, and are provided at their inner ends with the attaching eyes H, which loosely engage the outer exposed ends of the links F, thereby providing a loose and firm connection between the several spokes of the wheel and the hub collars.

It will be apparent that by reason of casting the body of the hub collars onto the interior spacing rings E, and the main portion of the links F, connected to said rings, a very firm anchor is provided to which the spokes are to be connected, and by reason of the loose connection of the spokes to the exposed ends of the links of the anchor just described, the said spokes readily adjust themselves to all strain placed thereon, so that the strain will be eased sufficiently from the spokes in order to prevent the same from either bending out of shape or from breaking away from their hub connections.

It is well understood by those skilled in the art that the lateral strain, placed on spokes of metallic vehicle wheels, finds its greatest resistance at the connection of the spokes with the hub, and as the greater strain is at this point it usually causes the end of the spokes to break its connection with the hub.

Many advantages will suggest themselves, and I will have it understood that changes in the form, proportion and the minor details of construction may be resorted to without departing from the principle or sacrificing any of the advantages of this invention.

Having thus described my invention, what I claim, and desire to secure by Letters Patent, is—

1. In a metallic vehicle wheel, the combination with a cast hub; of separate attaching links partially embedded in the metal of the hub and having outer exposed ends, and the spokes loosely connected at their inner ends to the outer exposed ends of said links, substantially as set forth.

2. In a metallic vehicle wheel, the combination with a cast hub; of a spacing ring embedded in the metal of the hub, attaching links embracing said spacing ring, and the wheel spokes loosely connected at their inner ends to said links, substantially as set forth.

3. In a metallic vehicle wheel, the combination with the hub having cast collars; of spacing rings embedded in the metal of said collars, attaching links partially embedded in the metal of the collars and connected at their inner ends to said spacing rings, and the spokes provided at their inner end with eyes loosely engaging the outer exposed ends of the links, substantially as set forth.

In testimony that I claim the foregoing as my own I have hereto affixed my signature in the presence of two witnesses.

CORODON S. CANNON.

Witnesses:
JOEL C. HOPKINS,
PETER CROSBY.